(12) United States Patent
Li et al.

(10) Patent No.: US 10,042,490 B2
(45) Date of Patent: Aug. 7, 2018

(54) ARRAY SUBSTRATE, DISPLAY DEVICE AND DRIVING METHOD

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN); Conghua Ma, Shanghai (CN); Xingyao Zhou, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 90 days.

(21) Appl. No.: 14/922,025

(22) Filed: Oct. 23, 2015

(65) Prior Publication Data

US 2016/0291775 A1 Oct. 6, 2016

(30) Foreign Application Priority Data

Apr. 1, 2015 (CN) .......................... 2015 1 0153207

(51) Int. Cl.
*G06F 3/044* (2006.01)
(52) U.S. Cl.
CPC .... *G06F 3/044* (2013.01); *G06F 2203/04103* (2013.01); *G06F 2203/04107* (2013.01)

(58) Field of Classification Search
CPC ....................... G06F 2203/04107; G06F 3/044
See application file for complete search history.

(56) References Cited

U.S. PATENT DOCUMENTS

| | | | |
|---|---|---|---|
| 2013/0162570 A1* | 6/2013 | Shin | G06F 3/041 345/173 |
| 2014/0132534 A1* | 5/2014 | Kim | G06F 3/0412 345/173 |
| 2015/0268528 A1* | 9/2015 | Lee | G02F 1/136286 349/47 |

\* cited by examiner

*Primary Examiner* — Michael Faragalla
*Assistant Examiner* — Chayce Bibbee
(74) *Attorney, Agent, or Firm* — Alston & Bird LLP (57) ABSTRACT

An array substrate, a display device and a driving method are provided. The array substrate includes a substrate. A common electrode layer and multiple gate lines and data lines are arranged above the substrate. Multiple pixel units are defined by intersecting the gate lines with the data lines insulatively. The multiple pixel units include thin-film transistors and pixel electrodes. Electrode block wires and wire shielding electrodes are arranged above the substrate. The common electrode layer includes electrode blocks arranged in a matrix. In a direction perpendicular to the substrate, the electrode block wire is arranged opposite to the electrode block, and is electrically connected to the electrode block to provide a touch signal or display signal to the electrode block; and the electrode block wire partially overlaps with the wire shielding electrode, and is arranged between the wire shielding electrode and the substrate.

13 Claims, 5 Drawing Sheets

ARRAY SUBSTRATE, DISPLAY DEVICE AND DRIVING METHOD

CROSS REFERENCE OF RELATED APPLICATION

The present application claims the priority to Chinese Patent Application No. 201510153207.7, entitled "ARRAY SUBSTRATE, DISPLAY DEVICE AND DRIVING METHOD", filed on Apr. 1, 2015 with the State Intellectual Property Office of the Peoples Republic of China, which is incorporated herein by reference in its entirety.

BACKGROUND

At an initial stage of development of touch display technology, a touch display panel is formed by attaching a touch panel to a display panel, for achieving touch display. In this case, the touch panel and display panel are fabricated independently with a high cost, a great thickness and a low production efficiency.

With the development of touch display integration technology, a common electrode of an array substrate of the display panel may be reused as a touch sensing electrode for touch detection, and touch and display functions may be realized simultaneously by driving to perform touch control and display control in a time-sharing manner. In this case, the touch sensing electrode is integrated in the display panel directly, thereby reducing the fabrication cost and the thickness of the panel, and improving the production efficiency.

In a case that the common electrode is reused as the touch sensing electrode, a common electrode layer is divided into multiple electrode blocks. To perform the touch control and the display control in a time-sharing manner, each of the electrode blocks is provided with a voltage signal via a single wire. Via the wire, a touch sensing signal is provided to the electrode block corresponding to the wire in a touch time period and a common voltage signal is provided to the electrode block in a display time period.

The existing touch display panels can realize the touch function and the display function with a poor accuracy of touch detection.

BRIEF DESCRIPTION OF THE DRAWINGS

The drawings to be used in the description of embodiments or the conventional technology are described briefly as follows, so that technical solutions according to the embodiments of the present disclosure or according to the conventional technology may become clearer. It is obvious that the drawings in the following description only illustrate some embodiments of the present disclosure. For those skilled in the art, other drawings may be obtained based on these drawings without any creative work.

DETAILED DESCRIPTION OF EMBODIMENTS

Technical solutions according to embodiments of the present disclosure are described clearly and completely hereinafter in conjunction with the drawings. It is obvious that the described embodiments are only a part rather than all of the embodiments according to the present disclosure. Any other embodiments obtained by those skilled in the art based on the embodiments in the present disclosure without any creative work fall in the scope of the present disclosure.

Figure 1A:
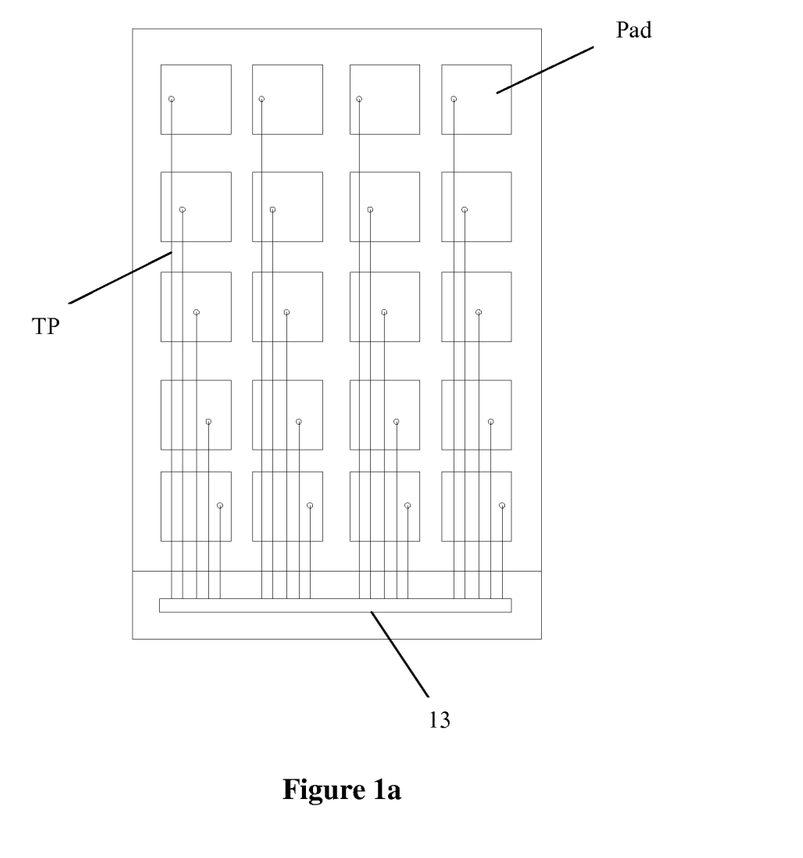
FIG. 1a is a schematic structural diagram of a touch display device.

Reference is now made to FIG. 1a, which is a schematic structural diagram of a touch display device. The touch display device includes a common electrode layer. The common electrode layer includes multiple electrode blocks Pads distributed in an array. For each electrode block Pad, one electrode block wire TP is arranged, for providing a display signal (i.e. common voltage signal) to the electrode block Pad during a display operation performed by the touch display device and providing a touch signal to the electrode block Pad during a touch detection performed by the touch display device. The electrode wires TPs are extended to the same end of the display device in the same direction, so as to be connected to a control chip 13. Specifically, the control chip 13 is a touch detection chip.

Generally, the control chip 13 is connected to the electrode block wires TPs of the touch display device through a Flexible Printed Circuit (FPC), to provide touch signals to the electrode block wires TPs and acquire sensing signals in the touch detection to determine a touch position.

Among the same column of electrode blocks Pads, an electrode block wire TP for an electrode block Pad further away from the control chip 13 overlaps with an electrode block Pad closer to the control chip 13. In the touch detection, when a finger touches an electrode block Pad closer to the control chip 13, capacitances may also be induced between the finger and electrode block wires TPs for other electrode blocks Pads overlapping with the touched electrode block Pad. Thus, a crosstalk between touch signals is induced and the accuracy of the touch detection is reduced. The crosstalk between touch signals is as follows. In a case that an electrode block Pad closer to the control chip 13 is touched, electrode block wires TPs for electrode blocks Pads, which are further away from the control chip 13 and are in the same column with the touched electrode block Pad, overlap with the touched electrode block Pad, and thus spurious sensing signals are generated on the electrode block wires TPs overlapping with the touched electrode block TP. In a case that the control chip 13 performs touch detection, the control chip 13 reports touch positions of the untouched electrode blocks Pads once the changes of the spurious sensing signals on the electrode block wires TPs for the untouched electrode blocks Pads exceed a threshold. Therefore, error touch positions are reported and the accuracy of the touch detection is reduced.

Figure 1B:
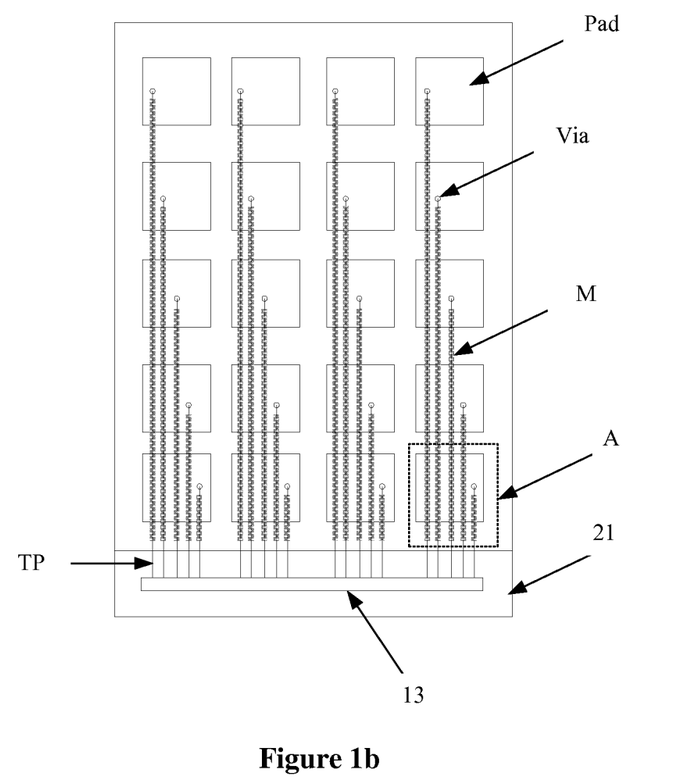
FIG. 1b is a top view of an array substrate according to an embodiment of the present disclosure.
Figure 1C:
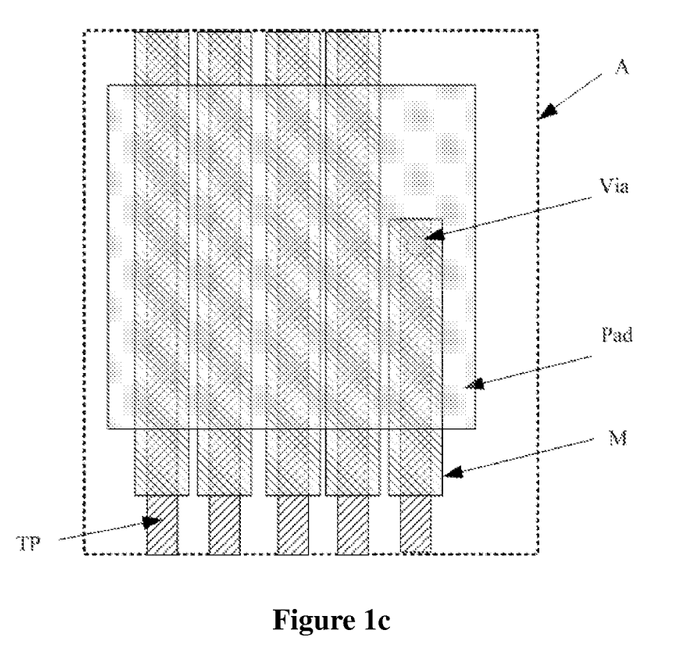
FIG. 1c is a partially enlarged diagram of a region A of the array substrate shown in FIG. 1b.

To solve the above problem, it is provided an array substrate in an embodiment of the present disclosure. Referring to FIGS. 1b and 1c, FIG. 1b is a top view of an array substrate according to the embodiment of the present disclosure, and FIG. 1c is a partially enlarged diagram of a region A of the array substrate shown in FIG. 1b. The array substrate includes a substrate 21. Multiple gate lines and data lines are arranged on the substrate 21. Multiple pixel units are defined by intersecting the gate lines with the data lines insulatively (i.e. the data lines and gate lines are insulated from each other). The multiple pixel units include thin-film transistors and pixel electrodes. A common electrode layer, electrode block wires TPs and wire shielding electrodes Ms are arranged above the substrate 21. The common electrode layer includes multiple electrode blocks Pads. In a direction perpendicular to the substrate 21, the electrode block wire TP is arranged opposite to the electrode block Pad, and is electrically connected to the electrode block Pad to provide a touch signal or a display signal to the electrode block Pad. In the direction perpendicular to the substrate 21, the electrode block wire TP partially overlaps with the wire shielding electrode M, and is arranged between the wire shielding electrode M and the substrate 21.

In the direction perpendicular to the substrate 21, the common electrode layer is arranged opposite to the electrode block wire TP. That is, the common electrode layer is arranged in a different layer from the electrode block wire TP. Therefore, an electrode block Pad is electrically connected to an electrode block wire TP corresponding to the electrode block Pad through a via hole Via. As the same in FIG. 1, the electrode block wires TPs are extended to the same end of the display device in the same direction, so as to be connected to the control chip 13. Specifically, the control chip 13 is a touch detection chip.

In the array substrate, a wire shielding electrode M is arranged above the electrode block wire TP, for electromagnetically shielding the electrode block wire TP to prevent a spurious sensing signal from being generated between an electrode block wire TP for an untouched electrode block Pad and a finger. Hence, an error report of the touch position is avoided during the touch detection and the accuracy of the touch detection is improved.

In the array substrate according to an embodiment of the present disclosure, in the direction perpendicular to the substrate, the pixel electrode, the common electrode layer, the electrode block wire TP and the wire shielding electrode M may have various positional relationships. It can be seen from FIG. 1c that, the wire shielding electrode M is arranged above the electrode block wire TP and the electrode block Pad is arranged above the wire shielding electrode M, which is only an implementation of the embodiment of the present disclosure, and other implementations will not be described herein.

In the following, some embodiments for the positional relationship are described in conjunction with the drawings, so that the technical solutions according to the embodiments of the present disclosure become clearer. It should be noted that, the technical solution according to the embodiments of present disclosure includes but is not limited to the following embodiments.

Figure 2:
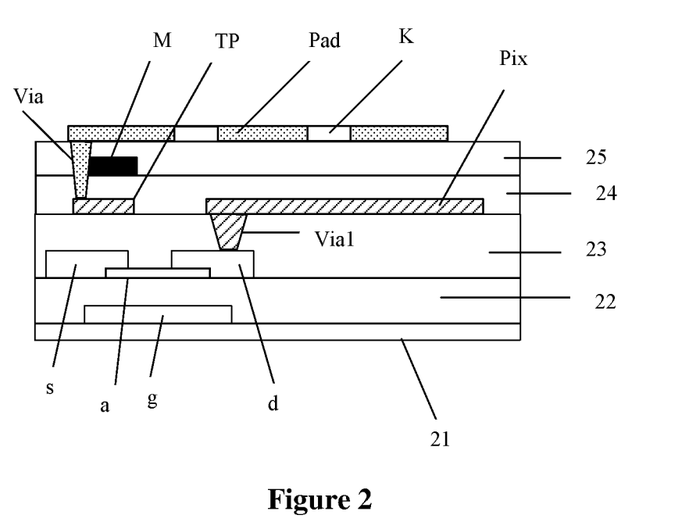
FIG. 2 is a schematic structural diagram of an array substrate according to an embodiment of the present disclosure.

In the above array substrate, the pixel electrode may be arranged between the common electrode layer and the substrate. In this case, the array substrate may have the structure as shown in FIG. 2, which is a schematic structural diagram of an array substrate according to an embodiment of the present disclosure. In conjunction with relative positions between the wire shielding electrode M, the electrode block wire TP and the electrode block Pad, in the array substrate, the thin-film transistor is arranged on a surface of the substrate 21 and includes a gate electrode g, a source electrode s, a drain electrode d and an active layer a.

Specifically, the gate electrode g is arranged on a surface of the substrate 21. A surface of the gate electrode g further away from the substrate 21 is covered by a gate dielectric layer 22. The active layer a is arranged on a surface of the gate dielectric layer 22 further away from the substrate 21 and is arranged opposite to the gate electrode g. The source electrode s and the drain electrode d are respectively connected to the active layer a. The gate line and the data line are not shown in FIG. 2. The gate line is arranged in the same layer with the gate electrode g, and the data line is arranged in the same layer with the source electrode s and the drain electrode d.

In FIG. 2, the thin-film transistor is arranged on the surface of the substrate. A surface of the thin-film transistor further away from the substrate is covered by a first insulation layer 23, and the first insulation layer 23 covers the source electrode s, the drain electrode d and the active layer a.

A pixel electrode Pix and the electrode block wire TP each are arranged on a surface of the first insulation layer 23 further away from the substrate 21. Surfaces of the pixel electrode Pix and the electrode block wire TP further away from the substrate 21 are covered by a second insulation layer 24. A first via hole Vial is formed in the first insulation layer 23, and a part of the drain electrode d of the thin-film transistor is exposed through the first via hole. The pixel electrode Pix is electrically connected to the drain electrode d of the thin-film transistor through the first via hole Vial. In this case, the first via hole Vial passes through the first insulation layer 23.

The wire shielding electrode M is arranged on a surface of the second insulation layer 24 further away from the substrate 21, and a third insulation layer 25 is arranged on a surface of the wire shielding electrode M further away from the substrate 21. The common electrode layer is arranged on a surface of the third insulation layer 25 further away from the substrate 21. An electrode block Pad in the common electrode layer is electrically connected to an electrode block wire TP corresponding to the electrode block Pad through a via hole Via. In this case, the via hole Via passes through both the second insulation layer 24 and the third insulation layer 25.

In the array substrate shown in FIG. 2, since the common electrode layer is arranged above the pixel electrode Pix, a liquid crystal layer is arranged above the array substrate in a case that the array substrate is fabricated as a liquid crystal display device, and liquid crystal molecules of the liquid crystal layer are driven and controlled by the common electrode layer and the pixel electrode Pix. In this case, an opening K is formed on each electrode block Pad of the common electrode, so that an electric field between the electrode Pad and the pixel electrode Pix drives and controls the liquid crystal molecules through the opening K.

Figure 3:
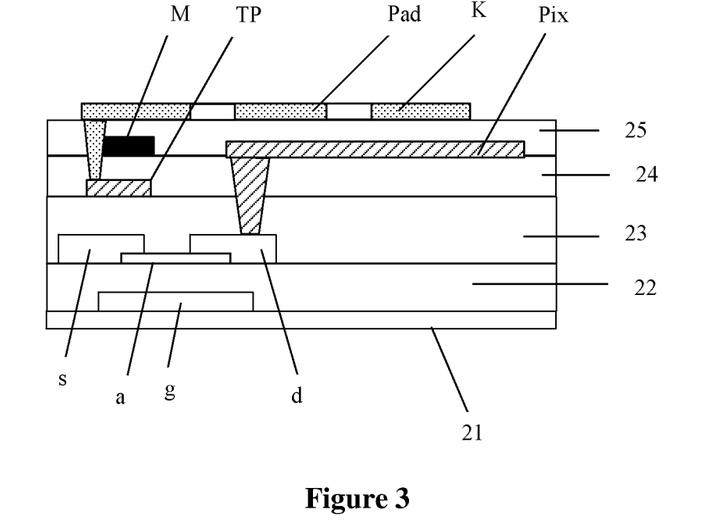
FIG. 3 is a schematic structural diagram of an array substrate according to an embodiment of the present disclosure.

In a case when the pixel electrode is arranged between the common electrode layer and the substrate, the array substrate may has the structure as shown in FIG. 3, which is a schematic structural diagram of another array substrate according to an embodiment of the present disclosure.

In FIG. 3, the thin-film transistor is arranged on the surface of the substrate 21, and the surface of the thin-film transistor further away from the substrate 21 is covered by the first insulation layer 23. The electrode block wire TP is arranged on the surface of the first insulation layer 23 further away from the substrate 21. The surface of the electrode block wire TP is covered by the second insulation layer 24.

The pixel electrode Pix and the wire shielding electrode M are arranged on the surface of the second insulation layer 24 further away from the substrate 21. The first via hole Vial is formed in the first insulation layer 23 and the second insulation layer 24, and a part of the drain electrode d of the thin-film transistor is exposed through the first via hole Vial. The pixel electrode Pix is electrically connected to the drain electrode d of the thin-film transistor corresponding to the pixel electrode Pix through the first via hole Vial. The third insulation layer 25 is arranged on surfaces of the pixel electrode Pix and the wire shielding electrode M further away from the substrate 21. The common electrode layer is arranged on the surface of the third insulation layer 25 further away from the substrate 21.

The embodiment shown in FIG. 3 differs from the embodiment shown in FIG. 2 in that the pixel electrode Pix is arranged on the surface of the second insulation layer 24 further away from the substrate 21. That is, the pixel electrode Pix is arranged in the same layer with the wire shielding electrode M. In this case, the first via hole Vial passes through both the second insulation layer 24 and the first insulation layer 23.

According to the embodiments shown in FIGS. 2 and 3, the array substrates each include three insulation layers. The pixel electrode Pix is prepared in the same layer with the electrode block wire TP or in the same layer with the wire shielding electrode M, to simplify the fabrication process and reduce the fabrication cost.

In the array substrate according to an embodiment of the present disclosure, the common electrode layer may also be arranged between the pixel electrode and the substrate. In this case, the array substrate may have the structure as shown in FIG. 4, which is a schematic structural diagram of another array substrate according to an embodiment of the present disclosure.

Figure 4:
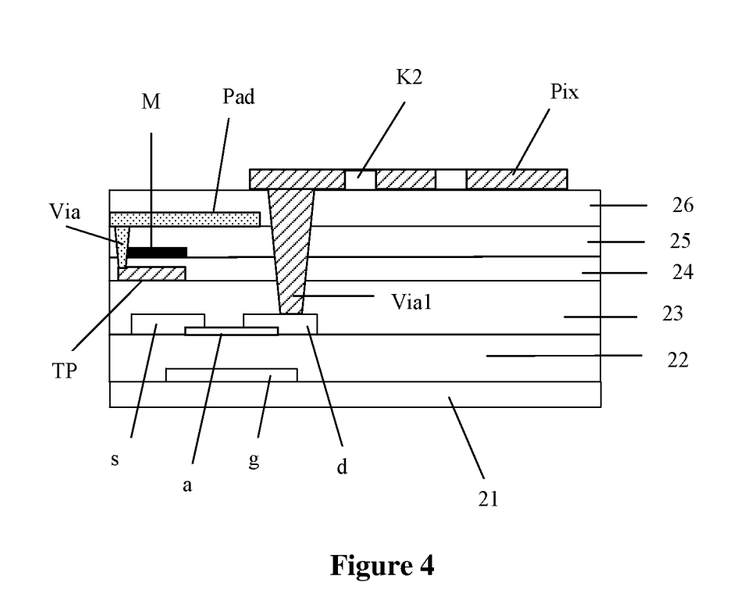
FIG. 4 is a schematic structural diagram of an array substrate according to an embodiment of the present disclosure.

In FIG. 4, the thin-film transistor is arranged on the surface of the substrate 21, and the surface of the thin-film transistor further away from the substrate 21 is covered by the first insulation layer 23. The electrode block wire TP is arranged on the surface of the first insulation layer 23 further away from the substrate 21, and the surface of the electrode block wire TP further away from the substrate 21 is covered by the second insulation layer 24. The wire shielding electrode M is arranged on the surface of the second insulation layer 24 further away from the substrate, and the third insulation layer 25 is arranged on the surface of the wire shielding electrode M further away from the substrate 21. The common electrode layer is arranged on the surface of the third insulation layer 25 further away from the substrate 21, and a fourth insulation layer 26 is arranged on the surface of the third insulation layer 25 further away from the substrate 21. The pixel electrode Pix is arranged on a surface of the fourth insulation layer 26 further away from the substrate 21. The first via hole Vial is formed in the first insulation layer 23, the second insulation layer 24, the third insulation layer 25 and the fourth insulation layer 26, and the drain electrode d of the thin-film transistor is exposed through the first via hole Vial. The pixel electrode Pix is electrically connected to the drain electrode of the thin-film transistor through the first via hole Vial.

As compared with the array substrate shown in FIG. 2, the array substrate shown in FIG. 4 further includes the fourth insulation layer 26, and the first via hole Vial passes through the first insulation layer 23, the second insulation layer 24, the third insulation layer 25 and the fourth insulation layer 26. The electrode block wire TP, the wire shielding electrode M and the via hole Via have the same relative location relations and structures as those shown in FIG. 2. The common electrode layer has the same location and structure as shown in FIG. 2, and is arranged on the surface of the third insulation layer. Since the pixel electrode Pix is arranged above the common electrode, an opening K2 is formed on the pixel electrode Pix and no opening is formed on the electrode block Pad in the common electrode layer.

Since the common electrode layer and the pixel electrode each are applied with work voltages for display driving and the common electrode layer further performs touch detection on the full screen, the common electrode layer cannot be arranged in the same layer with the pixel electrode.

In a case that the common electrode layer is arranged between the pixel electrode and the substrate, the common electrode layer may be arranged below the electrode block wire, and the pixel electrode is arranged in the same layer with the electrode block wire, to reduce the number of the insulation layers. In this case, the structure of the array substrate is as shown in FIG. 5, which is a schematic structural diagram of yet another array substrate according to an embodiment of the present disclosure.

Figure 5:
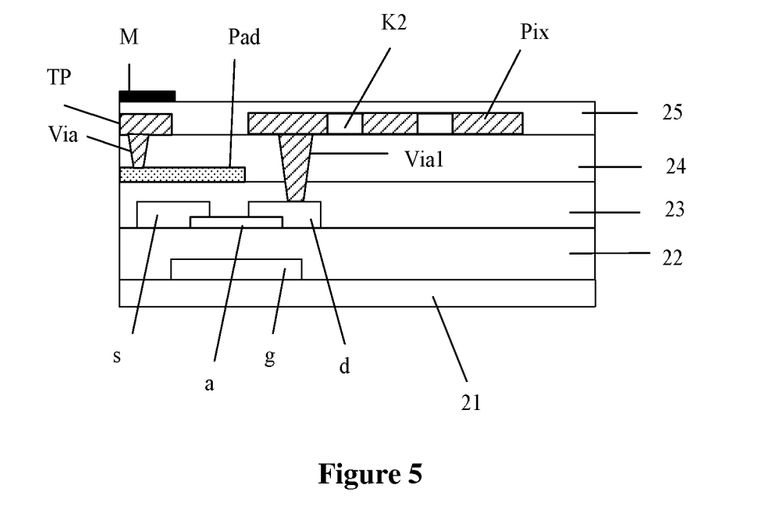
FIG. 5 is a schematic structural diagram of an array substrate according to an embodiment of the present disclosure.

In FIG. 5, the thin-film transistor is arranged on the surface of the substrate, and the surface of the thin-film transistor further away from the substrate 21 is covered by the first insulation layer 23. The common electrode layer is arranged on the surface of the first insulation layer 23 further away from the substrate 21, and the second insulation layer 24 is arranged on the surfaces of the first insulation layer 23 and the common electrode layer further away from the substrate 21. The electrode block wire TP and the pixel electrode Pix are arranged on the surface of the second insulation layer 24 further away from the substrate 21. The first via hole Vial is formed in the first insulation layer 23 and the second insulation layer 24, and a part of the drain electrode d of the thin-film transistor is exposed through the first via hole Vial. The pixel electrode Pix is electrically connected to the drain electrode d of the thin-film transistor through the first via hole Vial. The third insulation layer 25 is arranged on the surfaces of the pixel electrode Pix and the electrode block wire TP further away from the substrate 21. The wire shielding electrode M is arranged on the surface of the third insulation layer 25 further away from the substrate 21.

In the embodiment shown in FIG. 5, since the pixel electrode Pix is arranged above the common electrode layer, an opening K2 is formed on the pixel electrode Pix.

In the array substrate shown in any one of FIGS. 2 to 5, in the direction perpendicular to the substrate 21, the thin-film transistor is arranged between the substrate 21 and the wire shielding electrode M. The thin-film transistor includes an active layer a. In the direction perpendicular to the substrate 21, a projection of the wire shielding electrode M on the surface of the substrate 21 completely covers a projection of the active layer a on the surface of the substrate 21. Thus, a light ray above the array substrate is prevented from illuminating the active layer a, and a light current is avoided from being generated in the active layer to affect the display driving.

In addition, in the direction perpendicular to the substrate 21, the projection of the wire shielding electrode M on the surface of the substrate 21 completely covers a projection of the electrode block wire TP on the surface of the substrate 21, in order to ensure that the electrode block wire TP is electromagnetically shielded by the wire shielding electrode M effectively.

In fabricating a liquid crystal device including a conventional array substrate, a black matrix needs to be arranged on a color film substrate to occlude the thin-film transistor, the gate line and data line in the array substrate. In contrast, in the present disclosure, instead of preparing a black matrix on the color film substrate, the wire shielding electrode M with a preset pattern structure may be provided to achieve a function of a black matrix, thereby reducing the process flow and fabrication cost.

In a case that the function of the black matrix is achieved by the wire shielding electrode M, the wire shielding electrode M may be set to be opaque. In the direction perpendicular to the substrate 21, the gate line, the date line and the thin-film transistor are arranged between the wire shielding electrode M and the substrate 21. In the direction perpendicular to the substrate 21, the projection of the wire shielding electrode M on the surface of the substrate 21 completely covers a projection of the data line on the surface of the substrate 21, a projection of the gate line on the surface of the substrate 21 and a projection of the thin-film transistor on the surface of the substrate 21.

The array substrate further includes a flexible print circuit. The data lines and electrode block wires of the array substrate are connected to a control chip via the flexible print circuit. The control chip is configured to provide a data signal to the data line and provide a display signal or a touch signal to the electrode block wire.

It can be seen from the above description that, in the array substrate according to the embodiments of the present disclosure, by providing the wire shielding electrode, a crosstalk between electrode block wires corresponding to the untouched electrode blocks is avoided and the accuracy of the touch detection is improved. Also, by achieving the function of the black matrix by the electrode block wire with the preset pattern structure instead of forming the black matrix on the color film substrate, the fabrication process of the display device is simplified and the fabrication cost is reduced.

Figure 6:
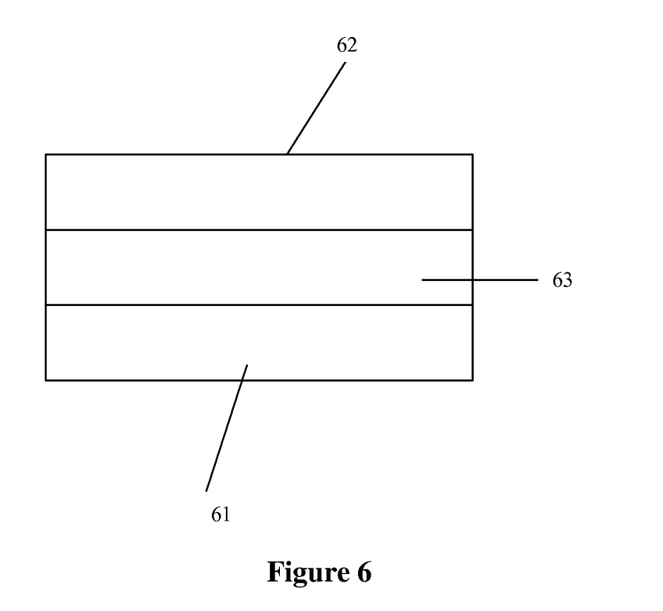
FIG. 6 is a schematic structural diagram of a display device according to an embodiment of the present disclosure.

It is further provided a display device in an embodiment of the present disclosure. Reference is made to FIG. 6, which is a schematic structural diagram of a display device according to an embodiment of the present disclosure. The display device includes: an array substrate 61 and a color film substrate 62 arranged opposite to each other, and a liquid crystal layer 63 arranged between the array substrate 61 and the color film substrate 62.

The display device includes a black matrix, and the black matrix may be arranged on a surface of the color film substrate facing to the liquid crystal layer. In this case, in the direction perpendicular to the substrate, a projection of the black matrix on the surface of the substrate completely covers the projection of the data line on the surface of the substrate, the projection of the gate line on the surface of the substrate and the projection of the thin-film transistor on the surface of the substrate.

The display device includes a black matrix, and the black matrix may be arranged on the array substrate. In this case, the wire shielding electrode which is opaque may be set as the black matrix, and the gate line, the data line and the thin-film transistor each are arranged between the wire shielding electrode and the substrate. In the direction perpendicular to the substrate, the projection of the wire shielding electrode on the surface of the substrate completely covers the projection of the data line on the surface of the substrate, the projection of the gate line on the surface of the substrate and the projection of the thin-film transistor on the surface of the substrate.

The display device may be an electronic apparatus, such as a mobile phone, a computer and a television. In the display device according to the embodiment, the array substrate is the one described in any one of the above embodiments. Therefore, the accuracy of the touch detection is higher. Furthermore, instead of providing the black matrix on the color film substrate, the wire shielding electrode may be reused as the black matrix of the display device, hence the fabrication process of the display device is simplified and the fabrication cost is reduced.

It is further provided a driving method in an embodiment of the present disclosure, which is applicable to the display device according to any one of the above embodiments. The driving method includes multiple display time periods and multiple touch time periods distributed alternately. The display time periods and the touch time periods are alternated for performing the image display and the touch detection in a time-sharing manner.

In the display time period, via an electrode block wire, a display signal is provided to an electrode block corresponding to the electrode block wire and a preset voltage signal is provided to the wire shielding electrode. In a display time period, the wire shielding electrode is provided with a display signal. When the display device displays an image, the wire shielding electrode is provided with the display signal which is the same as signals in the electrode block wires. Thus, a coupling capacitance between the wire shielding electrode and the common electrode layer or between the wire shielding electrode and the electrode block wire is avoided, and better image display effect is ensured.

In the touch time period, via the electrode block wire, a touch detection signal is provided to the electrode block corresponding to the electrode block wire and a preset voltage signal is provided to the wire shielding electrode. When the display device performs the touch detection, the wire shielding electrode is provided with the touch detection signal or is grounded. In this way, the electrode block wire below the wire shielding electrode may be electromagnetically shielded effectively. When the wire shielding electrode is provided with the touch detection signal, the wire shielding electrode is electrically connected to a control chip on the display device. The control chip is a touch detection chip, which provides the touch detection signal to the wire shielding electrode.

It can be seen from the above that, time-sharing drive for the touch detection and image display of the above display device may be implemented using the driving method according to the embodiment of the present disclosure, with higher touch detection accuracy and better image display effect.

With the above descriptions of the disclosed embodiments, the skilled in the art may achieve or use the present disclosure. Various modifications to the embodiments are apparent for the skilled in the art. The general principle herein can be implemented with other embodiments without departing from the spirit or scope of the disclosure. Therefore, the present disclosure should not be limited to the embodiments disclosed herein, but has the widest scope that is in conformity with the principle and the novel features disclosed herein.

The invention claimed is:

1. An array substrate comprising:
   a substrate;
   a plurality of gate lines and a plurality of data lines arranged on the substrate, insulated from each other;
   a plurality of pixel units formed by intersecting the plurality of gate lines with the plurality of data lines, wherein the plurality of pixel units comprises thin-film transistors and pixel electrodes;

a common electrode layer disposed over the substrate, wherein the common electrode comprises a plurality of electrode blocks;
a plurality of electrode block wires disposed on the substrate; and
a plurality of wire shielding electrodes disposed on the plurality of electrode block wires, wherein the plurality of wire shielding electrodes each overlaps partially at least one of the plurality of electrode block wires;
wherein the plurality of electrode block wires each is electrically connected to the electrode block through a via hole to provide a touch signal or display signal to the electrode block; and
wherein a projection of the plurality of the wire shielding electrodes at least partially overlaps a projection of the via hole on the substrate.

2. The array substrate according to claim 1, wherein
the thin-film transistor is arranged on a surface of the substrate, a surface of the thin-film transistor further away from the substrate is covered by a first insulation layer;
the pixel electrode and the electrode block wire are arranged on a surface of the first insulation layer further away from the substrate, surfaces of the pixel electrode and the electrode block wire further away from the substrate are covered by a second insulation layer, a first via hole is formed to pass through the first insulation layer, the pixel electrode is electrically connected to the thin-film transistor corresponding to the pixel electrode through the first via hole;
the wire shielding electrode is arranged on a surface of the second insulation layer further away from the substrate, a third insulation layer is arranged on a surface of the wire shielding electrode further away from the substrate; and
the common electrode layer is arranged on a surface of the third insulation layer further away from the substrate.

3. The array substrate according to claim 1, wherein
the thin-film transistor is arranged on a surface of the substrate, a surface of the thin-film transistor further away from the substrate is covered by a first insulation layer;
the electrode block wire is arranged on a surface of the first insulation layer further away from the substrate, a surface of the electrode block wire is covered by a second insulation layer;
the pixel electrode and the wire shielding electrode are arranged on a surface of the second insulation layer further away from the substrate; a first via hole is formed to pass through the first and second insulation layers, the pixel electrode is electrically connected to the thin-film transistor corresponding to the pixel electrode through the first via hole; a third insulation layer is arranged on surfaces of the pixel electrode and the wire shielding electrode further away from the substrate; and
the common electrode layer is arranged on a surface of the third insulation layer further away from the substrate.

4. The array substrate according to claim 1, wherein
the thin-film transistor is arranged on a surface of the substrate, a surface of the thin-film transistor further away from the substrate is covered by a first insulation layer;
the electrode block wire is arranged on a surface of the first insulation layer further away from the substrate, a surface of the electrode block wire further away from the substrate is covered by a second insulation layer;
the wire shielding electrode is arranged on a surface of the second insulation layer further away from the substrate, a third insulation layer is arranged on a surface of the wire shielding electrode further away from the substrate;
the common electrode layer is arranged on a surface of the third insulation layer further away from the substrate, a fourth insulation layer is arranged on a surface of the third insulation layer further away from the substrate; and
the pixel electrode is arranged on a surface of the fourth insulation layer further away from the substrate, a first via hole is formed to pass through the first, second, third and fourth insulation layers, the pixel electrode is electrically connected to the thin-film transistor through the first via hole.

5. The array substrate according to claim 1, wherein
the thin-film transistor is arranged on a surface of the substrate, a surface of the thin-film transistor further away from the substrate is covered by a first insulation layer;
the common electrode layer is arranged on a surface of the first insulation layer further away from the substrate, a second insulation layer is arranged on surfaces of the first insulation layer and the common electrode layer further away from the substrate;
the electrode block wire and the pixel electrode are arranged on a surface of the second insulation layer further away from the substrate, a first via hole is formed to pass through the first and second insulation layers, the pixel electrode is electrically connected to the thin-film transistor through the first via hole, a third insulation layer is arranged on surfaces of the pixel electrode and the electrode block wire further away from the substrate; and
the wire shielding electrode is arranged on a surface of the third insulation layer further away from the substrate.

6. The array substrate according to claim 1, wherein
the thin-film transistor is arranged between the substrate and the wire shielding electrode in the direction perpendicular to the substrate; and
the thin-film transistor comprises an active layer, and in the direction perpendicular to the substrate, a projection of the wire shielding electrode on a surface of the substrate completely covers completely a projection of the active layer on the surface of the substrate.

7. The array substrate according to claim 1, wherein
the wire shielding electrode is opaque, and in the direction perpendicular to the substrate, the gate line, the data line and the thin-film transistor are arranged between the wire shielding electrode and the substrate; and
in the direction perpendicular to the substrate, a projection of the wire shielding electrode on the surface of the substrate completely covers completely a projection of the data line on the surface of the substrate, a projection of the gate line on the surface of the substrate and a projection of the thin-film transistor on the surface of the substrate.

8. A display device, comprising:
an array substrate and a color film substrate arranged opposite to each other; and
a liquid crystal layer arranged between the array substrate and the color film layer,
wherein the array substrate comprises:
a substrate;
a plurality of gate lines and data lines are arranged on the substrate, insulated from each other;

a plurality of pixel units formed by intersecting the plurality of gate lines with the plurality of data lines, wherein the plurality of pixel units comprises thin-film transistors and pixel electrodes;

a common electrode layer disposed over the substrate, wherein the common electrode comprises a plurality of electrode blocks;

a plurality of electrode block wires disposed on the substrate; and a plurality of wire shielding electrodes disposed on the plurality of electrode block wires, wherein the plurality of wire shielding electrodes each overlaps partially at least one of the plurality of electrode block wires;

wherein the plurality of electrode block wires each is electrically connected to the electrode block through a via hole to provide a touch signal or display signal to the electrode block; and wherein a projection of the plurality of the wire shielding electrodes at least partially overlaps a projection of the via hole on the substrate.

9. The display device according to claim 8, wherein the display device comprises a black matrix arranged on a surface of the color film substrate facing to the liquid crystal layer; and in a direction perpendicular to the substrate, a projection of the black matrix on a surface of the substrate completely covers completely a projection of the data line on the surface of the substrate, a projection of the gate line on the surface of the substrate and a projection of the thin-film transistor on the surface of the substrate.

10. The display device according to claim 8, wherein the display device comprises a black matrix;

the wire shielding electrode is the black matrix and is opaque; the gate line, the data line and the thin-film transistor are arranged between the wire shielding electrode and the substrate; and in a direction perpendicular to the substrate, a projection of the wire shielding electrode on the surface of the substrate completely covers completely a projection of the data line on the surface of the substrate, a projection of the gate line on the surface of the substrate and a projection of the thin-film transistor on the surface of the substrate.

11. A driving method for driving a display device, wherein the display device comprises:

an array substrate and a color film substrate arranged opposite to each other; and a liquid crystal layer arranged between the array substrate and the color film layer, wherein the array substrate comprises:

a substrate;

a plurality of gate lines and data lines are arranged on the substrate, insulated from each other;

a plurality of pixel units formed by intersecting the plurality of gate lines with the plurality of data lines, wherein the plurality of pixel units comprises thin-film transistors and pixel electrodes;

a common electrode layer disposed over the substrate, wherein the common electrode comprises a plurality of electrode blocks;

a plurality of electrode block wires disposed on the substrate; and a plurality of wire shielding electrodes disposed on the plurality of electrode block wires, wherein the plurality of wire shielding electrodes each overlaps partially at least one of the plurality of electrode block wires;

wherein the plurality of electrode block wires each is electrically connected to the electrode block through a via hole to provide a touch signal or display signal to the electrode block; and wherein a projection of the plurality of the wire shielding electrodes at least partially overlaps a projection of the via hole on the substrate, wherein the driving method comprises:

setting a plurality of display time periods and touch time periods which are distributed alternately;

providing, in the display time period, a display signal to the electrode block and a preset voltage signal to the wire shielding electrode, via an electrode block wire corresponding to the electrode block; and providing, in the touch time period, a touch detection signal to the electrode block and a preset voltage signal to the wire shielding electrode, via the electrode block wire corresponding to the electrode block.

12. The driving method according to claim 11, wherein the wire shielding electrode is provided with the display signal in the display time period.

13. The driving method according to claim 11, wherein the wire shielding electrode is provided with the touch detection signal or is grounded in the touch time period.

* * * * *